(12) United States Patent  
Morris

(10) Patent No.: US 8,739,341 B1
(45) Date of Patent: Jun. 3, 2014

(54) COUNTERBALANCE FOR A FOLD OUT RAMP

(71) Applicant: Donald Morris, Littleton, CO (US)

(72) Inventor: Donald Morris, Littleton, CO (US)

(73) Assignee: Lift-U, division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 14/102,153

(22) Filed: Dec. 10, 2013

Related U.S. Application Data

(60) Continuation-in-part of application No. 13/951,232, filed on Jul. 25, 2013, now Pat. No. 8,621,696, which is a division of application No. 13/828,258, filed on Mar. 14, 2013, now Pat. No. 8,578,536.

(51) Int. Cl.
*B65G 69/28* (2006.01)

(52) U.S. Cl.
USPC ............................................. 14/71.3; 14/71.1

(58) Field of Classification Search
USPC .................................... 14/71.1, 71.3; 414/921
See application file for complete search history.

(56) References Cited

U.S. PATENT DOCUMENTS

| 796,933 | A | 8/1905 | Reed |
| 4,503,722 | A | 3/1985 | Suzuki |
| 5,338,264 | A | 8/1994 | Kempf |
| 6,010,298 | A | 1/2000 | Cohn |
| 6,203,265 | B1 | 3/2001 | Cohn |
| 6,210,098 | B1 | 4/2001 | Cohn |
| 6,238,168 | B1 | 5/2001 | Cohn |
| 6,602,041 | B2 | 8/2003 | Lewis |
| 6,843,635 | B2 | 1/2005 | Cohn |
| 6,951,041 | B2 * | 10/2005 | Hoofard et al. ................ 14/71.1 |
| 7,017,220 | B2 * | 3/2006 | Alexander et al. ............. 14/69.5 |
| 7,043,790 | B2 * | 5/2006 | Alexander et al. ............. 14/71.3 |
| 7,100,233 | B2 * | 9/2006 | Alexander et al. ............. 14/71.3 |
| 7,131,160 | B2 * | 11/2006 | Alexander et al. ............. 14/71.3 |
| 7,161,761 | B2 | 1/2007 | Atsumi |
| 7,162,761 | B2 * | 1/2007 | Alexander et al. ............. 14/71.3 |
| 7,213,286 | B2 * | 5/2007 | Hoofard et al. ................ 14/71.1 |
| 7,353,558 | B2 | 4/2008 | Alexander |
| 7,533,432 | B2 | 5/2009 | Morris |
| 7,533,433 | B2 | 5/2009 | Morris |
| 7,533,434 | B2 | 5/2009 | Morris |
| 7,657,957 | B2 | 2/2010 | Alexander |
| 7,681,272 | B2 | 3/2010 | Morris |
| 7,870,631 | B2 | 1/2011 | Morris |
| 7,913,341 | B1 | 3/2011 | Morris |
| 7,913,342 | B1 * | 3/2011 | Morris et al. ................... 14/71.3 |
| 7,913,343 | B1 * | 3/2011 | Cohn .............................. 14/71.3 |
| 8,020,234 | B2 * | 9/2011 | Johnson et al. ................ 14/71.3 |
| 8,032,963 | B2 | 10/2011 | Morris |
| 8,122,552 | B2 * | 2/2012 | Morris et al. ................... 14/71.3 |

(Continued)

*Primary Examiner* — Gary Hartmann
(74) *Attorney, Agent, or Firm* — Christensen O'Connor Johnson Kindness PLLC

(57) ABSTRACT

A ramp assembly includes a ramp portion configured for reciprocating motion between a stowed position, a deployed position, and a neutral position. The ramp assembly includes a counterbalance comprising a lug associated with the ramp portion so that movement of the ramp portion toward the deployed position moves the lug along an arcuate path in a first direction, and movement of the ramp portion toward the stowed position moves the lug along the arcuate path in a second direction. A link is coupled to the lug, and a guide is fixedly located relative to the stowed position of the ramp portion. A biasing element is associated with the link such that movement of the ramp portion away from the neutral position moves the biasing element toward the guide.

11 Claims, 17 Drawing Sheets

(56) References Cited

U.S. PATENT DOCUMENTS

| | | |
|---|---|---|
| 8,122,553 B1 | 2/2012 | Johnson |
| 8,132,281 B1 | 3/2012 | Johnson |
| 8,166,594 B1 | 5/2012 | Morris |
| 8,181,300 B1 | 5/2012 | Johnson |
| 8,230,539 B2 | 7/2012 | Morris |
| 8,234,737 B2 | 8/2012 | Morris |
| 8,250,693 B1 | 8/2012 | Johnson |
| 8,327,485 B1 | 12/2012 | Morris |
| 8,375,496 B1 | 2/2013 | Johnson |
| 8,438,683 B1 | 5/2013 | Morris |
| 8,578,536 B1 * | 11/2013 | Morris ............................ 14/71.3 |
| 8,621,696 B1 * | 1/2014 | Morris ............................ 14/71.3 |

* cited by examiner

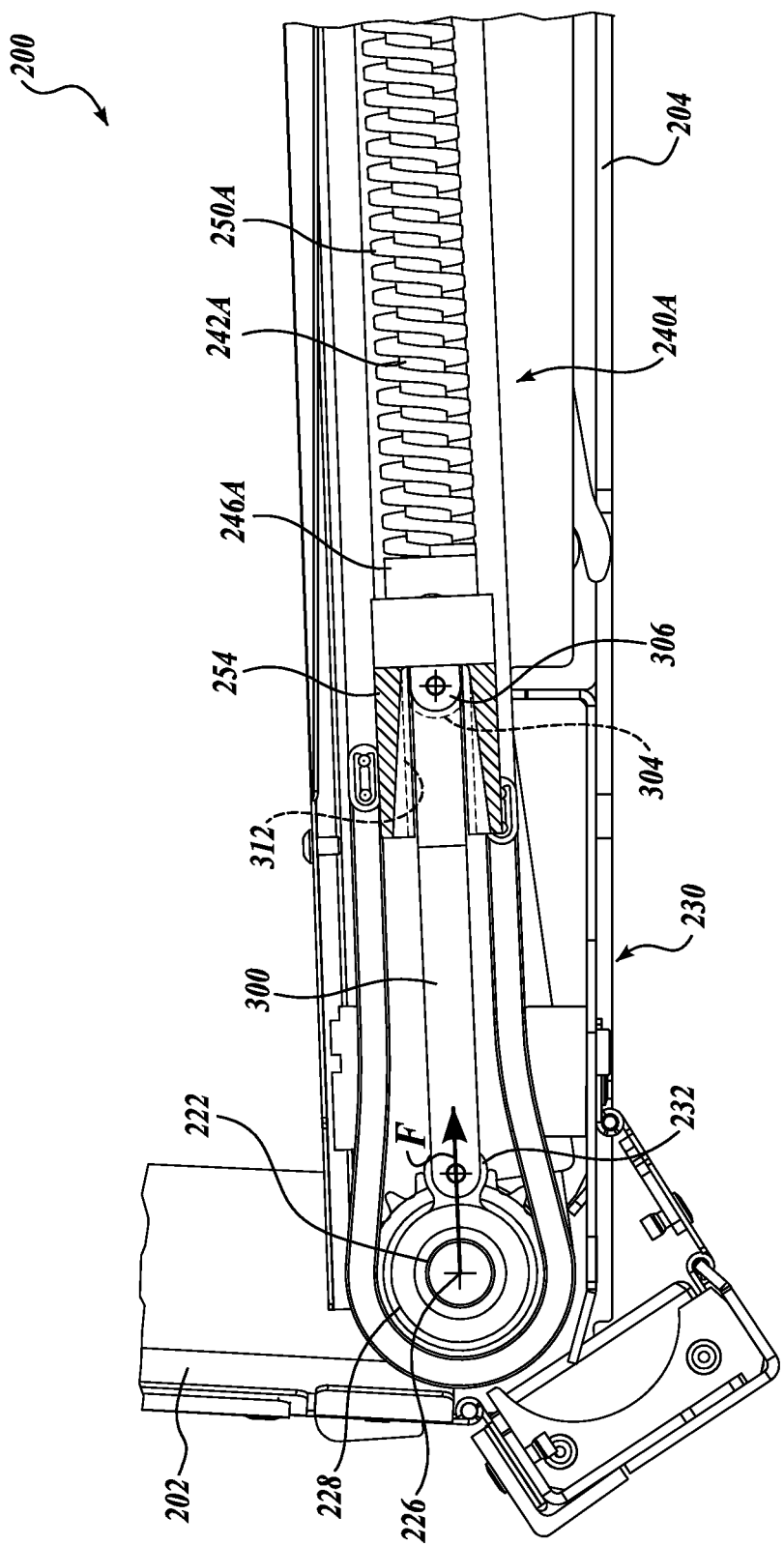

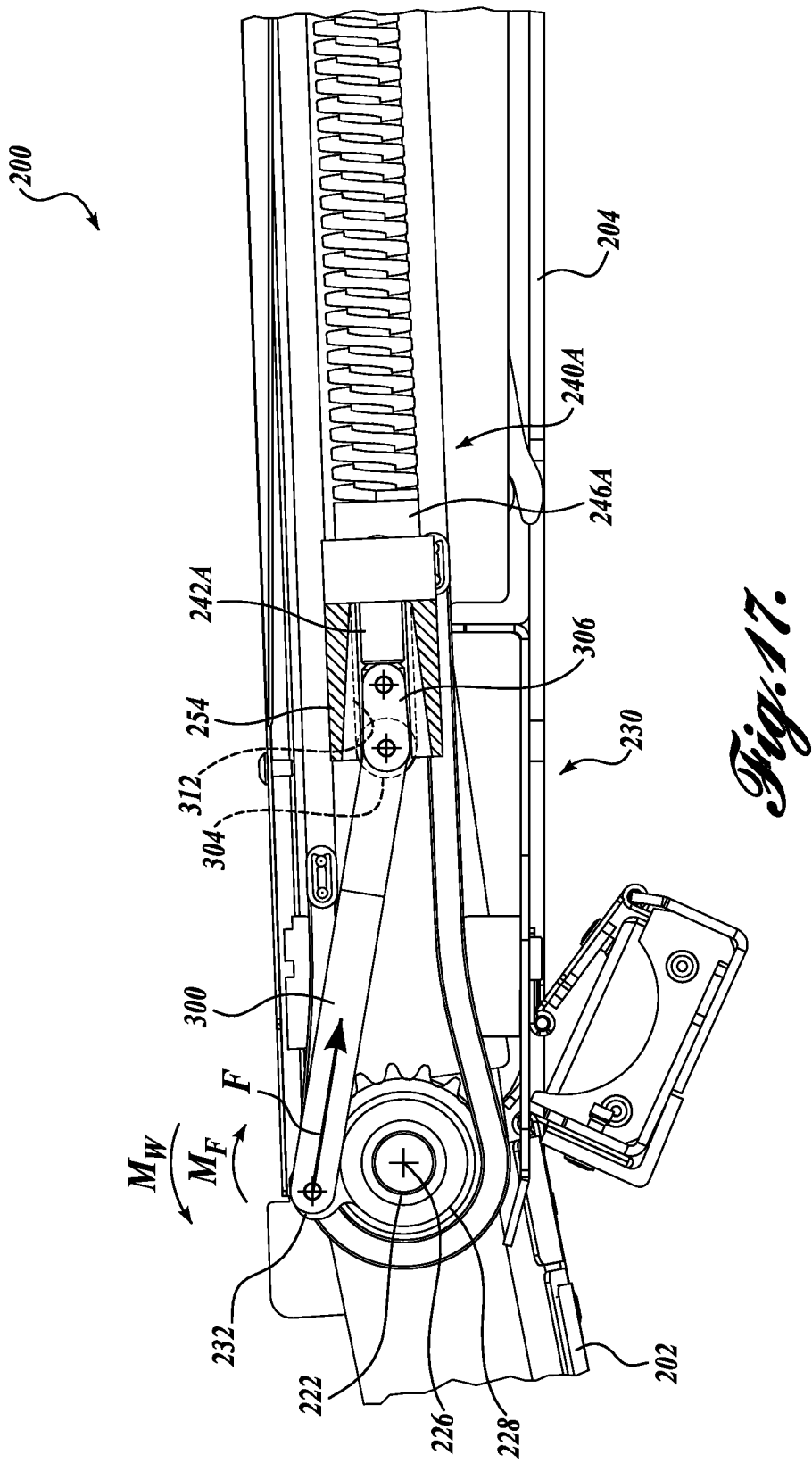

COUNTERBALANCE FOR A FOLD OUT RAMP

CROSS-REFERENCES TO RELATED APPLICATIONS

This application is a continuation-in-part of U.S. application Ser. No. 13/951,232, filed Jul. 25, 2013, which is a division of U.S. application Ser. No. 13/828,258, filed Mar. 14, 2013, now U.S. Pat. No. 8,578,536, the disclosures of which are incorporated herein by reference.

BACKGROUND

The Americans with Disabilities Act (ADA) requires the removal of physical obstacles to those who are physically challenged. The stated objective of this legislation has increased public awareness and concern over the requirements of the physically challenged. Consequentially, there has been more emphasis on providing systems that assist such people to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and are pivoted about a hinge, while still others are supported by booms and cable assemblies. The present disclosure is generally directed to a "fold out" type of ramp. Such a ramp is normally stowed in a horizontal position within a recess in the vehicle floor, and is pivoted upward and outward to a downward-sloping extended position. In the extended position, the ramp is adjustable to varying curb heights.

Fold out ramps on vehicles confront a variety of technical problems. Longer ramps are desirable because the resulting slope is more gradual and more accessible by wheelchair-bound passengers. Longer ramps are, however, heavier and require more torque about the hinge to be reciprocated between deployed and stowed positions. To satisfy this torque requirement, such fold-out ramps use large electric motors, pneumatic devices, or hydraulic actuators to deploy and stow the ramp. Many of such systems cannot be moved manually in the event of failure of the power source unless the drive mechanism is first disengaged. Some existing fold-out ramps can be deployed or stowed manually, but they are difficult to operate because one must first overcome the resistance of the drive mechanism.

As noted above, many existing fold-out ramps are equipped with hydraulic, electric, or pneumatic actuating devices. Such devices are obtrusive and make access to and from a vehicle difficult when the ramp is stowed. Moreover, many of such fold-out ramps have no energy storage capabilities to aid the lifting of the ramp, thereby preserving the life of the drive motor or even allowing a smaller drive to be employed. Finally, operating systems for such fold-out ramps must have large power sources to overcome the torque placed on the hinge by the necessarily long moment arm of the fold-out ramp.

SUMMARY

An exemplary embodiment of the claimed ramp assembly includes a ramp portion configured for reciprocating motion between a stowed position, a deployed position, and a neutral position. A counterbalance associated with the ramp portion comprises a lug associated with the ramp portion such that movement of the ramp portion toward the deployed position moves the lug along an arcuate path in a first direction, and movement of the ramp portion toward the stowed position moves the lug along the arcuate path in a second direction. The counterbalance further includes a guide fixedly located relative to the stowed position of the ramp portion. A link has a first end rotatably coupled to the lug. The link is also associated with a biasing element such that movement of the ramp portion away from the neutral position moves the biasing element toward the guide. A spring is disposed between the guide and the biasing element so that the spring is compressed when the ramp portion moves from the neutral position toward the stowed position, and also when the ramp portion moves from the neutral position toward the deployed position.

A second exemplary embodiment of a ramp assembly includes a ramp portion configured for reciprocating motion between a stowed position, a deployed position, and a neutral position. A counterbalance is associated with the ramp portion and includes a lug associated with the ramp portion. Movement of the ramp portion toward the deployed position moves the lug along an arcuate path in a first direction, and movement of the ramp portion toward the stowed position moves the lug along the arcuate path in a second direction. The counterbalance further includes a link having a first end rotatably coupled to the lug. A guide is fixedly located relative to the stowed position of the ramp portion. A biasing element is associated with the link. When the ramp portion moves from the neutral position toward the stowed position, the biasing element moves toward the guide. Similarly, when the ramp portion moves from the neutral position toward the deployed position, the biasing element moves toward the guide. The counterbalance also includes a spring disposed between the guide and the biasing element.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 16 shows a partial side view of the counterbalance assembly of FIG. 12, with the ramp portion in the neutral position; and FIG. 17 shows a partial side view of the counterbalance assembly of FIG. 12, with the ramp portion in a deployed position.

DETAILED DESCRIPTION

Exemplary embodiments of the present invention will now be described with reference to the accompanying drawings wherein like numerals correspond to like elements. The disclosed embodiments are directed to ramp assemblies, and specifically, to wheelchair ramp assemblies. In particular, described embodiments are directed to wheelchair ramp assemblies suitable for use in buses, vans, etc.

The following discussion proceeds with reference to examples of wheelchair ramp assemblies for use in vehicles having a floor, such as a bus, van, etc. While the examples provided herein have been described with reference to their association with vehicles, it will be apparent to one skilled in the art that this is done for illustrative purposes and should not be construed as limiting the scope of the claimed subject matter. Thus, it will be apparent to one skilled in the art that aspects of the present disclosure may be employed with other ramp assemblies used in stationary installations, such as residential buildings and the like.

The following detailed description may use illustrative terms such as vertical, horizontal, front, rear, curbside, roadside, inboard, outboard, proximal, distal, etc. However, these terms are descriptive in nature and should not be construed as limiting. Further, it will be appreciated that embodiments of the present disclosure may employ any combination of features described herein.

Figure 1:
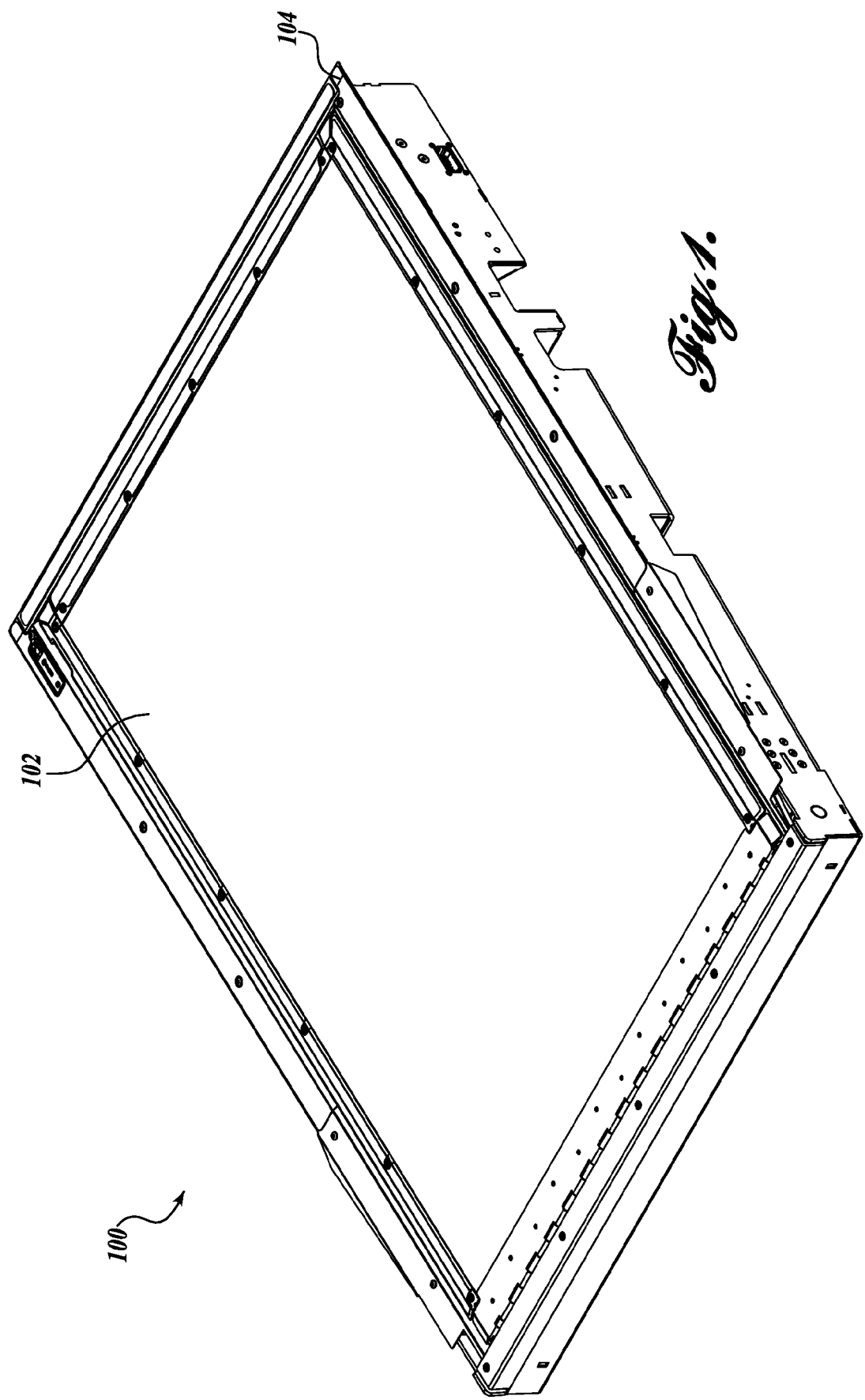
FIG. 1 shows an isometric view of a ramp assembly having a counterbalance mechanism, wherein a ramp portion is shown in a stowed position.
Figure 2:
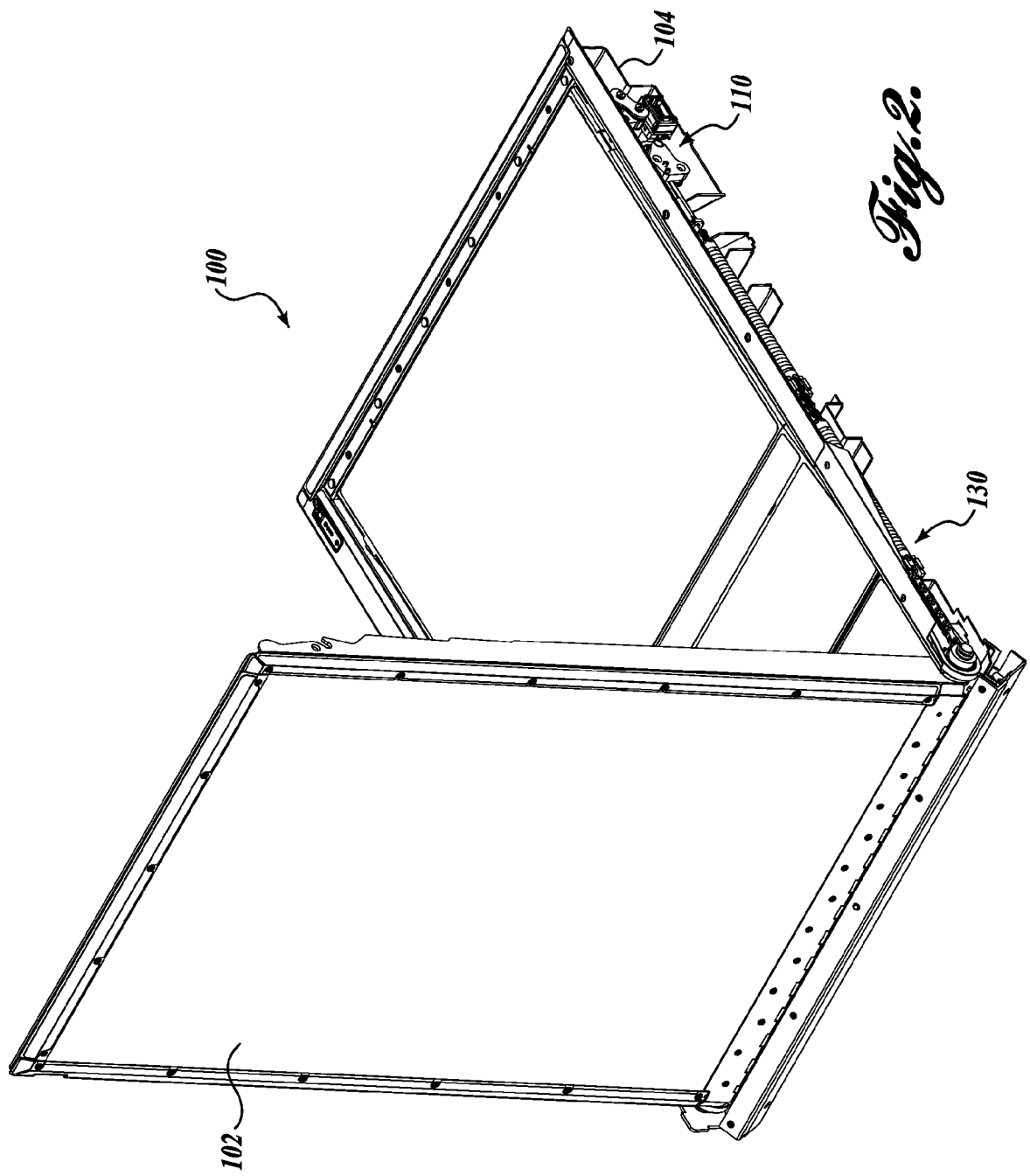
FIG. 2 shows an isometric view of the ramp assembly of FIG. 1, with the ramp portion in a neutral position.
Figure 3:
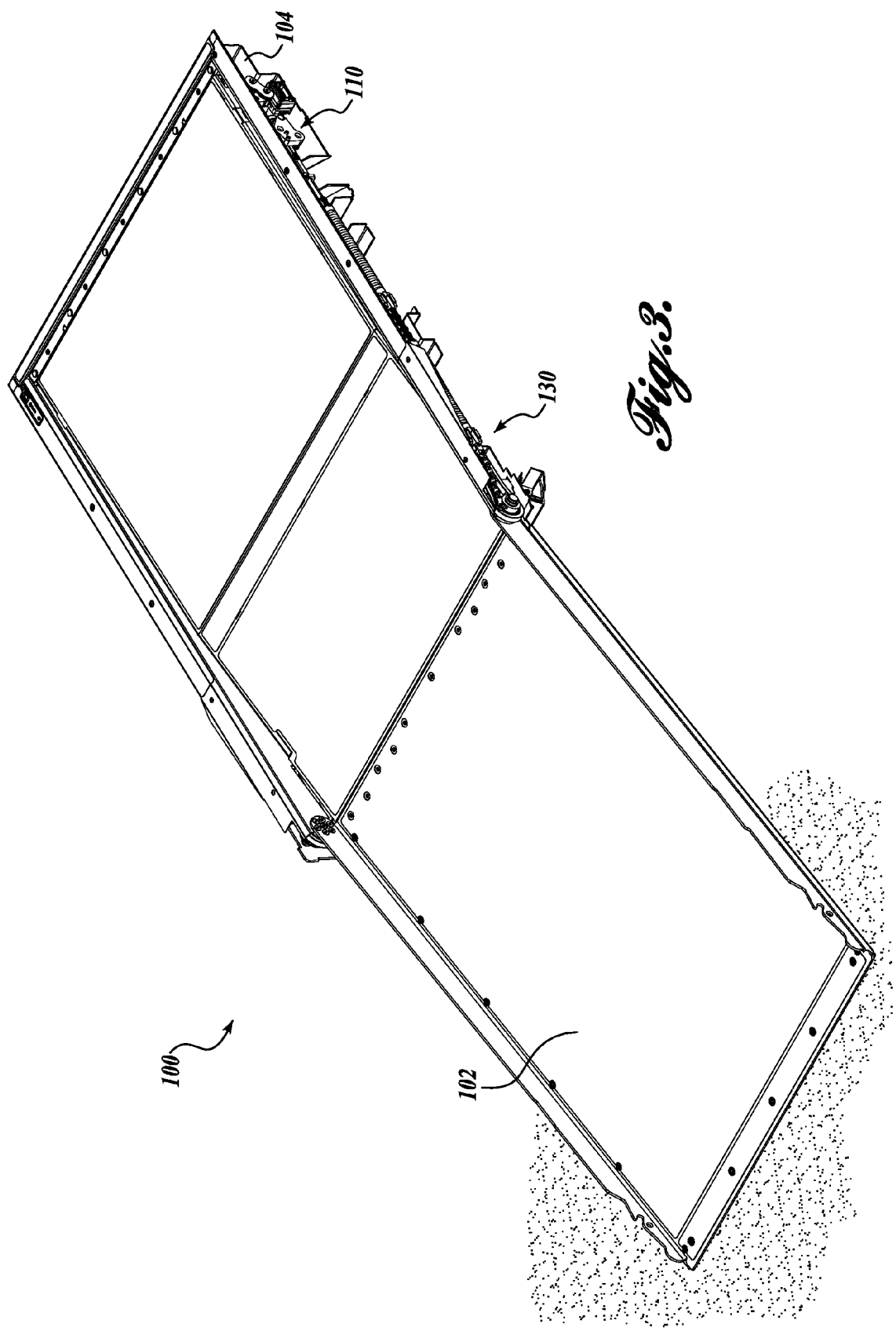
FIG. 3 shows an isometric view of the ramp assembly of FIG. 1, with the ramp portion in a deployed position.

FIGS. 1-3 illustrate an exemplary embodiment of a fold out ramp assembly 100 (hereinafter the "ramp assembly 100") suitable for use with the described counterbalance assemblies. The ramp assembly 100 is adapted to be mounted to a vehicle (not shown), such as a bus or a van and includes a ramp portion 102. The ramp portion 102 is mounted to be rotatable about one end so that the ramp portion 102 is reciprocal between the stowed position, as shown in FIG. 1, and a deployed position, as shown in FIG. 3.

When a ramp assembly is installed in a vehicle, some components of the ramp assembly 100 may maintain a fixed relationship relative to the vehicle structure, while other components move relative to the vehicle structure when the ramp reciprocates between a stowed position and a deployed position. Similarly, when a ramp assembly is installed in a stationary installation, such as a residential building and the like, some components of the ramp assembly may maintain a fixed relationship relative to the building structure, while other components move relative to the building structure when the ramp reciprocates between the stowed position and a deployed position.

As illustrated, the ramp assembly of FIGS. 1-3 includes a fixed portion 104. For such embodiments, the fixed portion 104 of the ramp assembly 100 maintains a fixed relationship to the vehicle or other structure to which the ramp assembly is mounted. It will also be appreciated that the fixed portion 104 of the ramp assembly also maintains a fixed relationship to any defined ramp position. That is, the fixed portion 104 of the ramp assembly 100 can be described as having a fixed relationship to the stowed position of the ramp portion, i.e., to the ramp portion when the ramp portion is in the stowed position. Similarly, the fixed portion 104 of the ramp assembly can be described as having a fixed relationship to the neutral position of the ramp portion, which is the position in which the center of gravity of the ramp portion 102 is positioned so that the weight of the ramp portion does not impart a moment on the ramp portion. Alternate embodiments that do not include a fixed portion are also possible. For such embodiments, the ramp portion is rotatably coupled directly to a portion of the vehicle or other structure to which the ramp assembly is mounted.

Figure 4:
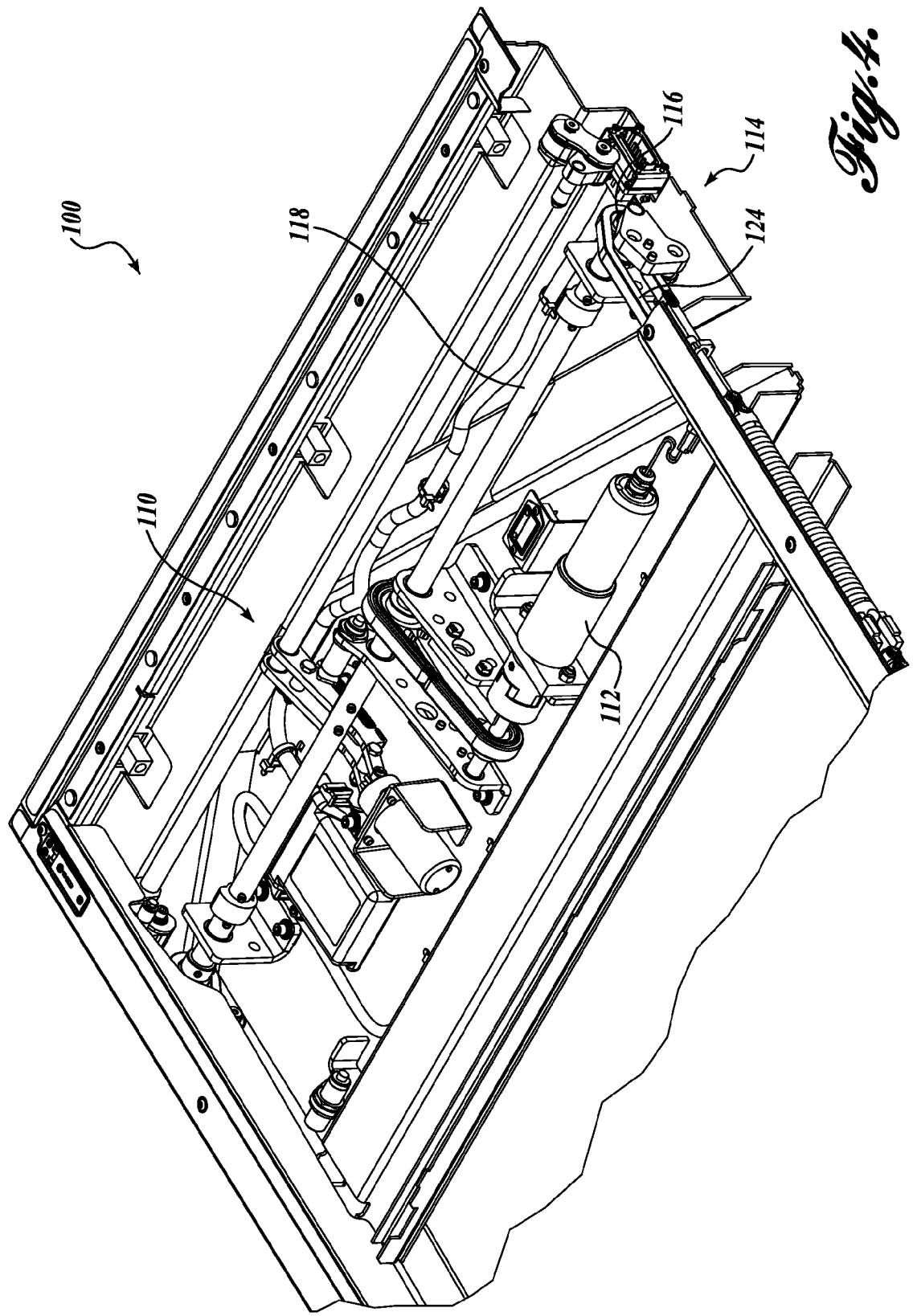
FIG. 4 shows a partial isometric view of a first exemplary embodiment of a drive assembly of the ramp assembly of FIG. 1.
Figure 5:
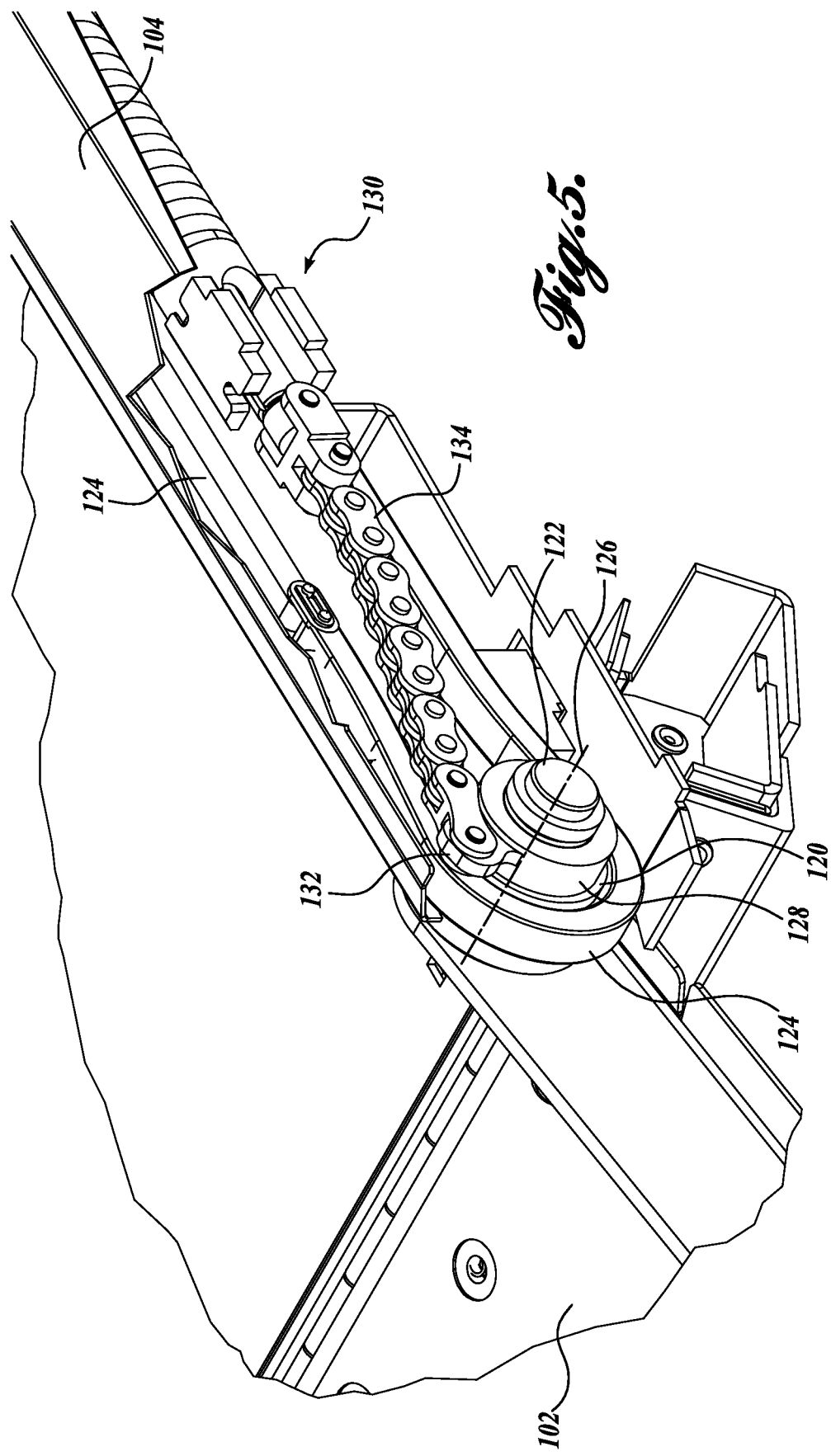
FIG. 5 shows a partial isometric view of a first exemplary embodiment of the counterbalance assembly of FIG. 1.

Referring to FIGS. 4 and 5, movement of the ramp portion 102 is powered by a drive assembly 110, which includes a motor 112 operatively coupled to the ramp portion with a transmission assembly 114. The transmission assembly 114 includes a roadside sprocket 116 operatively coupled to a drive shaft 118 that is selectively rotated by the motor 112. A curbside sprocket 120 is positioned along the curbside end of the ramp assembly. In the illustrated embodiment, the curbside sprocket 120 is rotatably coupled to a trunnion 122 that extends from and is fixed relative to the fixed portion 104 of the ramp assembly 100. The curbside sprocket 120 is operatively coupled to the ramp portion 102 so that rotation of the curbside sprocket 120 in a first direction actuates the ramp portion towards the stowed position, and rotation of the curbside sprocket in a second direction actuates the ramp portion towards a deployed position. A chain 124 forms an endless loop that engages the curbside sprocket 120 and the roadside sprocket 116 so that rotation of the roadside sprocket rotates the curbside sprocket 120, thus actuating the ramp portion 102.

The illustrated transmission assembly is exemplary only and should not be considered limiting. For example, although the transmission assembly 114 is described as a combination of sprockets 116 and 120 and a chain 124, other known transmission assemblies may be utilized, including but not limited to a plurality of gears, a belt and pulleys, etc. It is also anticipated that the drive shaft of the motor can be directly coupled to the ramp portion to provide an actuating force to the ramp portion. It will be apparent to one of ordinary skill in the art that these and other variations to the transmission assembly are possible. Accordingly, such alternate embodiments should be considered within the scope of the present disclosure.

In the illustrated embodiment, the trunnion 122 serves as a pivot axis for the ramp portion 102 and the curbside sprocket 120. That is, the central axis 126 of the trunnion 122 is coincident to the center of rotation of the ramp portion 102 as the ramp portion reciprocates between the stowed position and a deployed position. It should be appreciated that the curbside sprocket 120 and the ramp portion 102 need not rotate about the same axis 126. In this regard, the curbside sprocket 120 and the ramp portion 102 can have separate axes of rotation, wherein rotation of the curbside sprocket is transferred to the ramp portion by a suitable transmission configuration.

Figure 6:
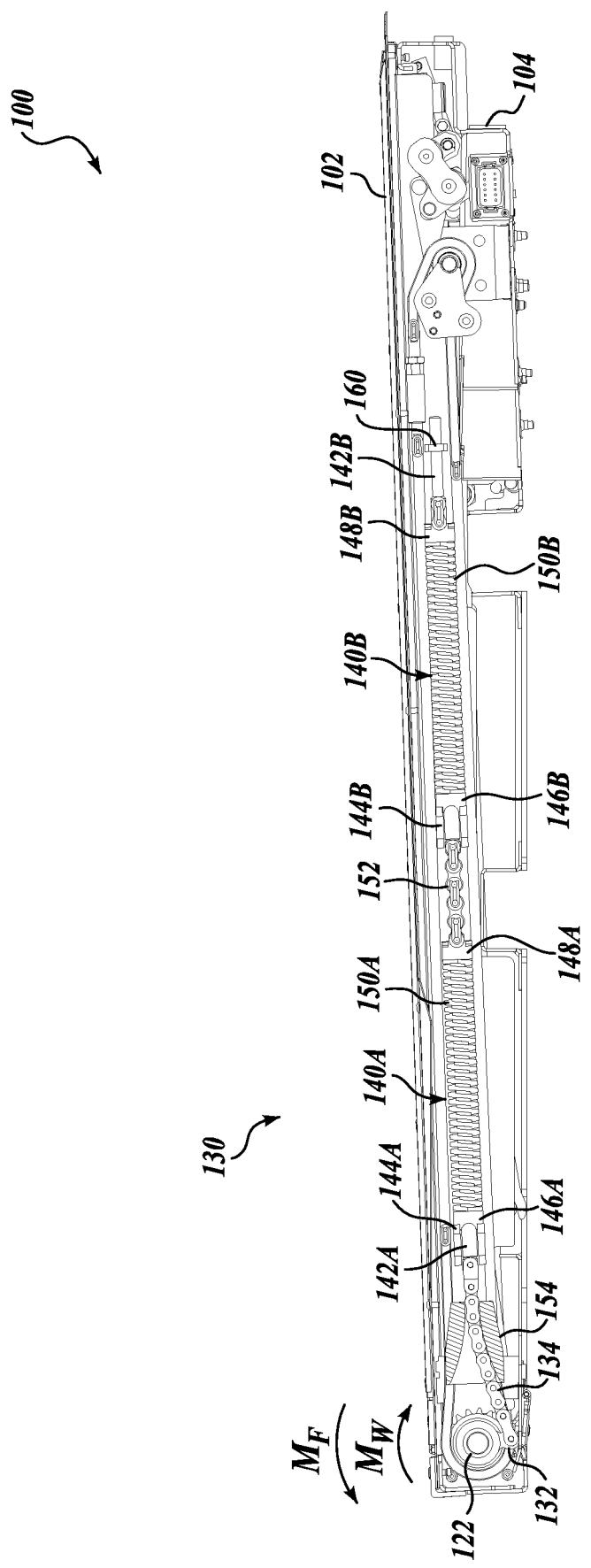
FIG. 6 shows a side view of the counterbalance assembly of FIG. 5, with the ramp portion in the stowed position.
Figure 7:
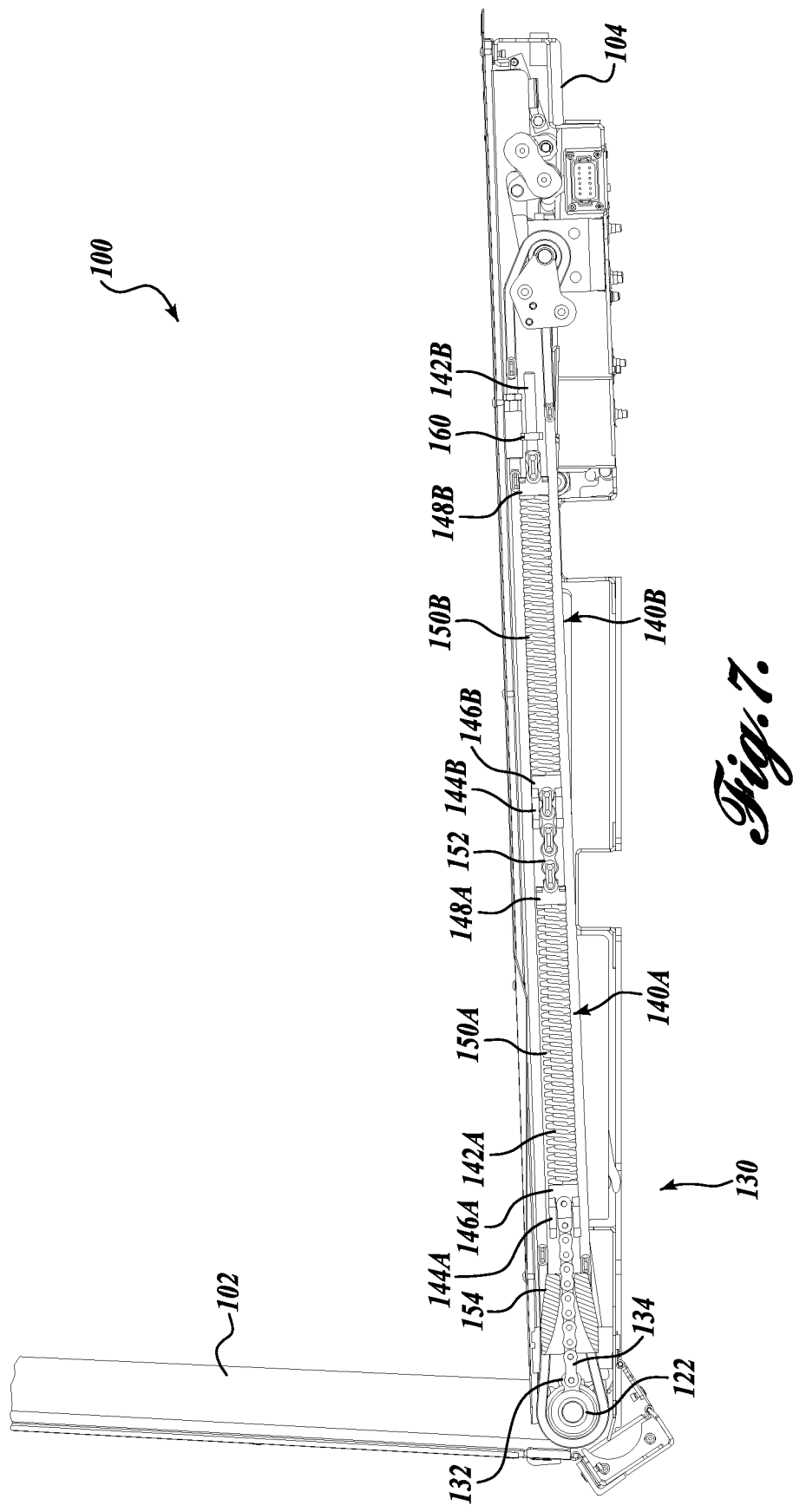
FIG. 7 shows a side view of the counterbalance assembly of FIG. 5, with the ramp portion in the neutral position.
Figure 8:
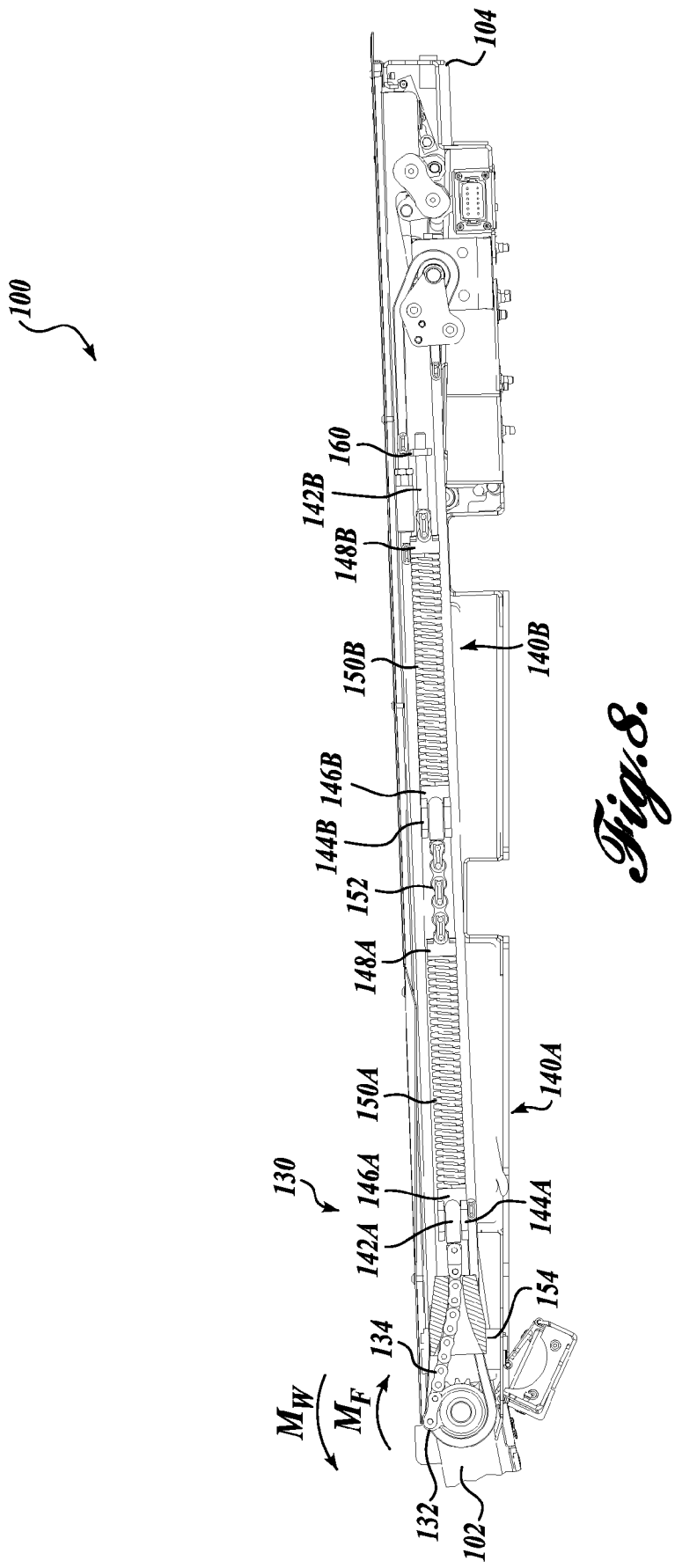
FIG. 8 shows a side view of the counterbalance assembly of FIG. 5, with the ramp portion in a deployed position.

FIGS. 6-8 show the ramp assembly 100 as the ramp portion 102 rotates from the stowed position (FIG. 6) through the neutral position (FIG. 7) to a deployed position (FIG. 8). Referring to FIG. 6, when the ramp is in the stowed position, the center of gravity (CG) of the ramp portion is positioned roadside of the center of rotation of the ramp portion 102 so that the weight of the ramp portion imparts a moment $M_W$ on the ramp portion 102 that tends to rotate the ramp portion away from the neutral position and toward the stowed position. Similarly, when the ramp portion 102 is in a deployed position, as shown in FIG. 8, the CG of the ramp portion is positioned curbside of the center of rotation of the ramp portion 102 so that the weight of the ramp portion imparts a moment $M_W$ on the ramp portion that tends to rotate the ramp portion away from the neutral position and toward the deployed position. The moment $M_W$ is the product of the weight W of the ramp portion 102 multiplied by moment arm $d_W$, which is the horizontal distance between the center of rotation and the CG of the ramp portion 102. As the ramp portion 102 moves from either the stowed position or a deployed position toward the neutral position, the moment arm $d_W$ decreases according to the cosine of the angle of the ramp portion relative to a horizontal plane. As a result, the moment $M_W$ also decreases according to the cosine of the angle of the ramp portion relative to a horizontal plane as the ramp portion 102 moves toward the neutral position.

When the ramp portion 102 is in the neutral position, as shown in FIG. 7, the CG of the ramp portion 102 is located directly over the center of rotation of the ramp portion 102, i.e., $d_W=0$. As a result, the weight of the ramp portion 102 does not impart any moment about the center of rotation of the ramp portion 102. In the illustrated embodiment, the neutral position is depicted as occurring when the ramp is in a substantially vertical position. It should be appreciated, however, that the position of the CG can vary according to the configuration of the ramp portion 102. Accordingly, the neutral position, i.e. the position at which the CG is located above the center of rotation of the ramp portion 102, can also vary according to the configuration of the ramp portion 102.

Referring to FIGS. 5-8, an exemplary embodiment of a counterbalance assembly 130 is shown. The counterbalance assembly 130 includes a hub 128 fixedly coupled to a forward side of the curbside sprocket 120 so that the hub rotates with the curbside sprocket. The counterbalance assembly 130 further includes a lug 132 extending radially outward from the hub 128. The lug moves along an arcuate path in a first direction when the ramp portion 102 moves toward the stowed position and along the arcuate path in a second direction when the ramp portion 102 moves toward a deployed position. Also envisioned are embodiments wherein the drive shaft 118 that couples the motor to the roadside sprocket 116 acts as the hub, i.e., the shaft to which the lug 132 is attached. Such a configuration would allow the counterbalance assembly to be located internal to the ramp assembly 100, i.e., under the ramp portion 102 when the ramp portion is in the stowed position. It should also be appreciated that the hub 128 can be any shaft associated with the ramp assembly 100 that rotates in a first direction when the ramp portion 102 moves toward the stowed position and in a second direction when the ramp portion moves toward a deployed position.

Figure 9:
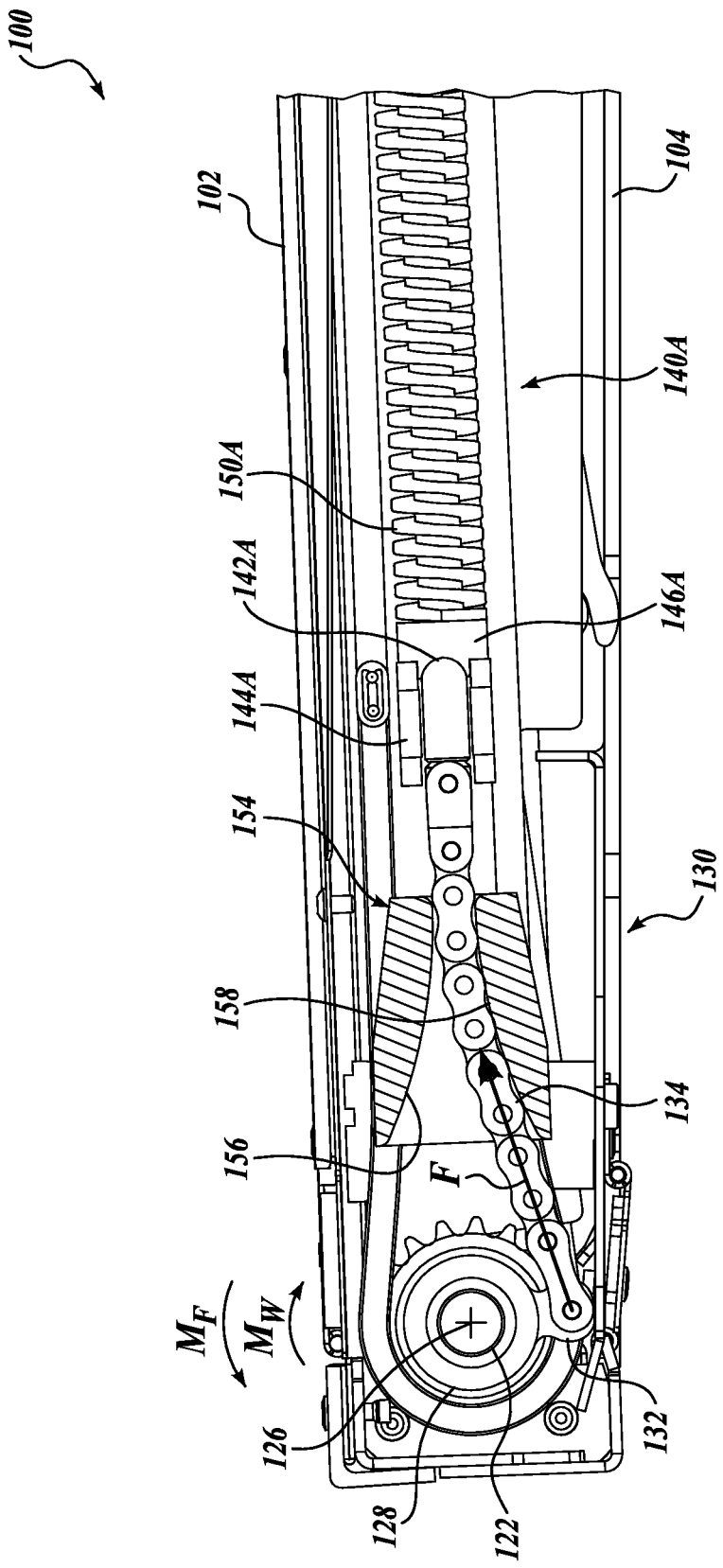
FIG. 9 shows a partial side view of the counterbalance assembly of FIG. 5, with the ramp portion in the stowed position.
Figure 10:
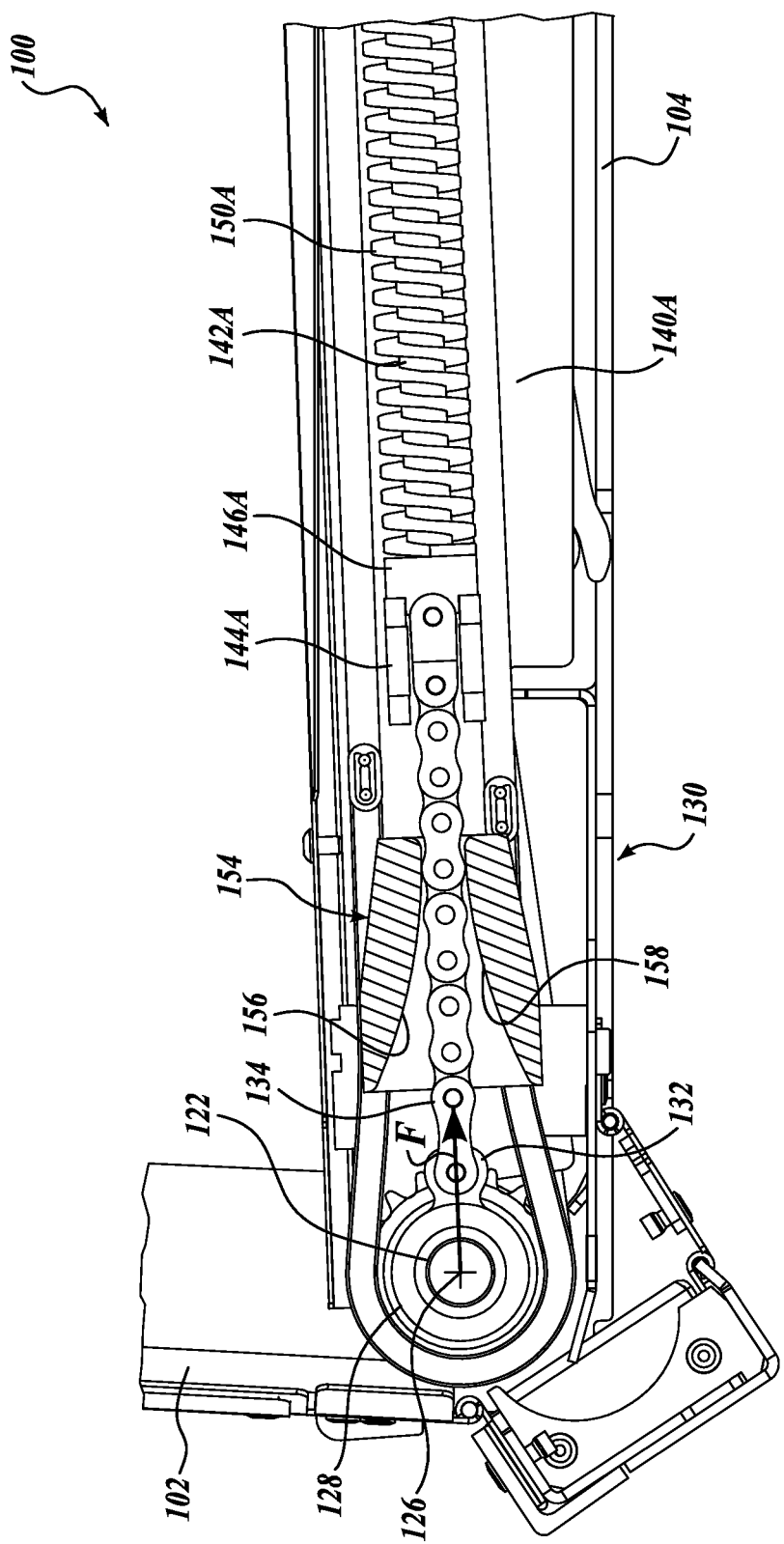
FIG. 10 shows a partial side view of the counterbalance assembly of FIG. 5, with the ramp portion in the neutral position.
Figure 11:
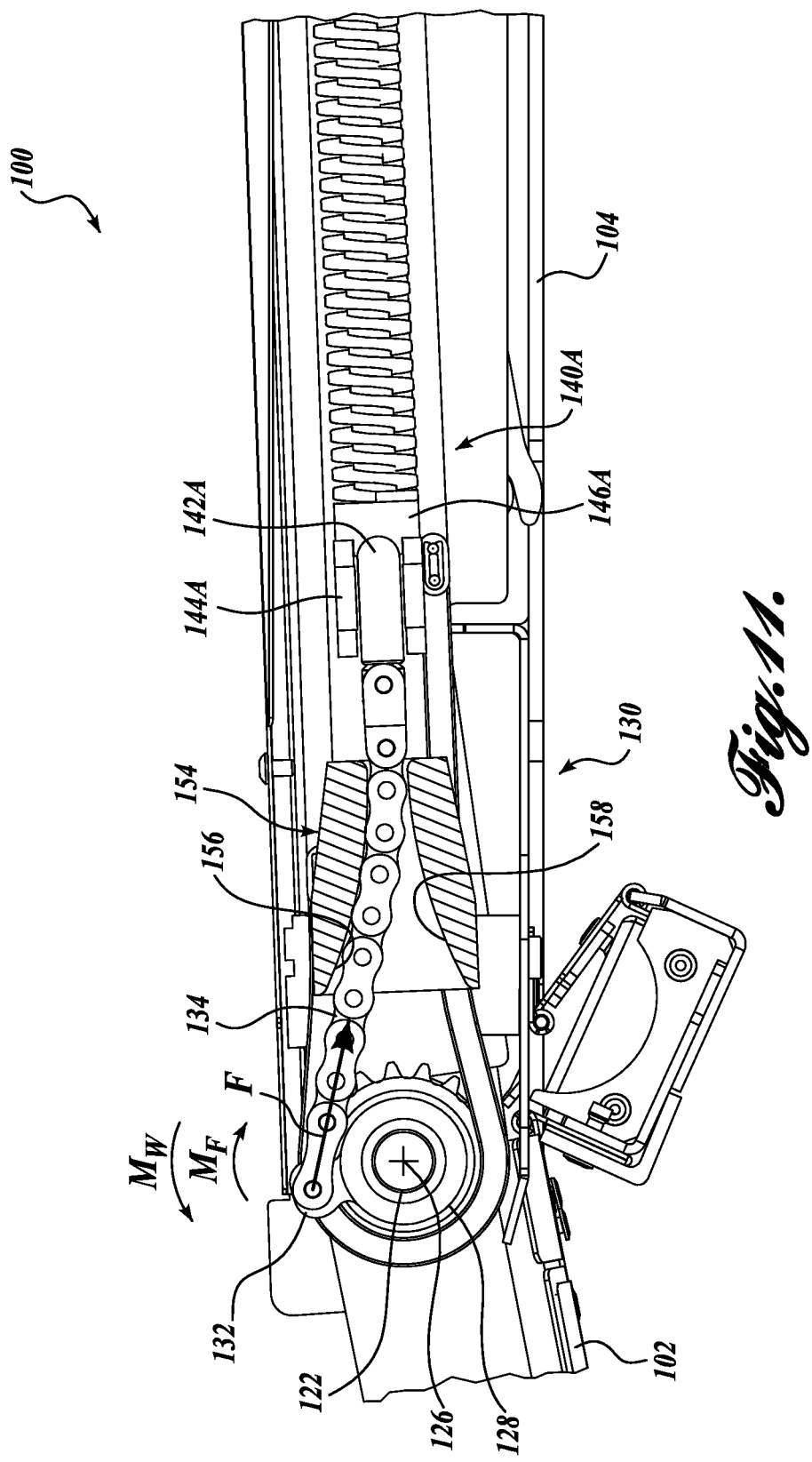
FIG. 11 shows a partial side view of the counterbalance assembly of FIG. 5, with the ramp portion in a deployed position.

A chain 134 is rotatably coupled at one end to the lug 132 and extends through a guide 154. More specifically, as shown in FIGS. 9-11, the chain 134 extends between an upper guide surface 156 and a lower guide surface 158 disposed on the guide 154. The chain 134 can be a roller chain, a leaf chain or any other suitable force transfer element that acts as a flexible line capable of transferring a pulling force. In this regard, the chain 134 can also be a cable, a belt, or any other flexible member capable of transferring a force in tension.

A second end of the chain 134 is coupled to a spring assembly 140A. Referring back to FIGS. 6-8, the spring assembly includes a rod 142A, which is slidably coupled to a fixed portion 104 of the ramp assembly 100. A restraint 144A is mounted to the fixed portion 104 and is slidably associated with the rod 142A. In the illustrated embodiment, the restraint 144A is a C-shaped channel wherein the rod is disposed between upper and lower legs of the restraint. It should be appreciated that the illustrated restraint 144A is exemplary only, and that alternate configurations are contemplated and should be considered within the scope if the present disclosure.

A spring stop 146A is slidably coupled to a proximal end of the rod 142A, and a biasing element 148A is fixedly coupled to a distal end of the rod. The spring stop 146A is positioned adjacent to the restraint 144A, and a spring 150A is disposed between the spring stop and the biasing element. The spring stop 146A and biasing element 148A are sized and configured to engage the ends of the spring 150A. More specifically, the spring stop 146A and biasing element 148A are sized and configured to control the position of each end of the spring 150A so that reciprocating movement of the ramp portion 102 between the stowed and deployed positions selectively compresses the spring. As shown in FIGS. 6-8, the spring stop 146A and biasing element 148A are generally cylindrical fittings that engage the ends of the spring. The illustrated embodiments, however, should not be considered limiting. In this regard, the spring stop 146A and biasing element 148A can take any form suitable for controlling the compression of the spring 150A as described herein. Such alternate configurations are contemplated and should be considered within the scope of the present disclosure As illustrated, the spring 150A is a coil compression spring with the rod 142A passing through the center of the coils; however, it will be appreciated that the type and position of the spring can vary. Alternate embodiments are contemplated in which the spring is a pneumatic spring or a hydraulic spring. Embodiments are also contemplated in which the spring is not aligned with the rod, but is instead offset from the rod. In this regard, the spring 150A can be any element that provides a force that resists movement of the rod 142A when the chain 124 pulls the rod 142A.

Still referring to FIGS. 6-8, a second spring assembly 140B is connected to the first spring assembly 140A. The second spring assembly 140B is similar to the previously described first spring assembly 140A, wherein reference numbers ending with "B" correspond to reference numbers ending with "A," e.g., rod 142B is similar in form and function to rod 142A. The distal end of the first rod 142A is coupled to a proximal end of the second rod 142B by a chain 152 or other suitable element capable of transferring a pulling force. A distal end of the second rod 142B is slidingly associated with a guide 160. In the illustrated embodiment, the guide 160 is a bracket with a hole through which the second rod 142B passes; however, one of ordinary skill in the art would appreciate that alternate embodiments are possible to slidingly restrain the distal end of the second rod 142B, and such alternate embodiments should be considered within the scope of the present disclosure.

As previously noted, when the ramp portion 102 is in the neutral position, the CG of the ramp portion is over the center of rotation of the ramp portion, and the weight of the ramp portion imparts no moment on the ramp portion. Referring to FIG. 10, when the ramp portion 102 is so positioned, any force F applied by the counterbalance assembly 130 is applied through the central axis 126 of the trunnion 122. As a result, the counterbalance 130 applies no moment to the ramp portion.

Movement of the ramp portion 102 from the neutral position (FIG. 10) toward the stowed position (FIG. 9) moves the lug 132 in a clockwise direction (as viewed in FIGS. 9 and 10) along an arcuate path. As a result, the lug 132 pulls the chain 134, which in turn moves the biasing elements 148A and 148B toward their associated spring stops 146A and 146B. The spring stops 146A and 146B are restrained by the restraints 144A and 144B. As the distance between the biasing elements 148A and 148B and the associated spring stops 146A and 146B decreases, the springs 150A and 150B are compressed. Compression of the springs 150A and 150B apply a force to the biasing elements 148A and 148B that bias the rods 142A and 142B, and therefore the chain 134, away from the trunnion 122. As a result, the chain 134 pulls on the lug 132 with a force F. The force F creates a moment $M_F$ about the center of rotation of the ramp portion 102 that tends to rotate the ramp toward the neutral position. The moment $M_F$ acts on the hub 128 to counteract the moment $M_W$ that results from the weight of the ramp portion 102. Thus, when the ramp portion 102 is between the neutral position and the stowed position, the spring assemblies 140A and 140B provide a force F that biases the ramp portion toward the neutral position.

Movement of the ramp portion 102 from the neutral position (FIG. 10) toward the deployed position (FIG. 11) moves the lug 132 in a counter-clockwise direction (as viewed in FIGS. 10 and 11) along an arcuate path. Movement of the lug along the arcuate path compresses the springs 150A and 150B as described above so that the chain 134 pulls on the lug 132 with a force F. The force F creates a moment $M_F$ about the center of rotation of the ramp portion 102 that tends to rotate the ramp toward the neutral position. The moment $M_F$ counteracts the moment $M_W$ that results from the weight of the ramp portion 102.

The springs 150A and 150B of the counterbalance assembly 130 are preferably selected to minimize the difference between the force supplied by the spring and the force required to counteract the moment $M_W$ as the ramp portion 102 reciprocates between a stowed position and a deployed position. For linear springs, the spring stiffness can be selected such that the linear increase in spring resistance is a best fit of the sinusoidal increase of the moment $M_F$. As a result, the difference between $M_W$ and $M_F$ is minimized. In other embodiments, non-linear springs are used so that the resistance supplied by the spring increases at a non-linear rate, allowing the spring resistance to match more closely the force required to resist the moment $M_F$ as the ramp portion 102 reciprocates between a stowed position and a deployed position. Non-linear springs are known in the art. For example, a spring formed with a variable coil pitch will exhibit non-linear properties. It should be understood that various known spring configurations providing linear or non-linear reactive force can be included in the counterbalance assembly 130 without departing from the spirit and scope of the present invention. In addition, alternate systems can be used to provide a resistive force, such as pneumatic or hydraulic systems (springs) and other systems known in the art.

As shown in FIG. 10, the lug 132 of the illustrated counterbalance assembly 130 is positioned on the hub 128 such that the force F supplied by the counterbalance assembly acts through the center of rotation of the ramp portion 102 when the ramp portion is in the neutral position. It will be appreciated that alternate embodiments are possible wherein the lug 132 is positioned so that the force F supplied by the counterbalance assembly 130 acts through the center of rotation of the ramp portion 102 when the ramp portion 102 is in a position other than the neutral position. In this regard, it is contemplated that for certain ramp assembly configurations, the moment $M_F$ supplied by the counterbalance assembly 130 will more closely match the moment $M_W$ caused by the weight of the ramp portion if the counterbalance produces no moment, i.e., $M_F=0$, when the ramp portion is offset from the neutral position. Such embodiments are contemplated and should be considered within the scope of the present disclosure.

In the disclosed embodiment, the springs 150A and 150B engage the biasing elements 148A and 148B and the spring stops 146A and 146B when the ramp portion 102 is in the neutral position. In this position, the compression springs 150A and 150B may be partially compressed. Because the force F is applied through the central axis 126 of the trunnion 122, the force does not result in a moment $M_F$ about the center of rotation of the ramp portion 102. Alternately, the springs 150A and 150B may be uncompressed when the ramp portion 102 is in the neutral position so that the springs apply no force F to the lug 132.

Referring now to FIGS. 12-17, a ramp assembly 200 having a second exemplary embodiment of a counterbalance assembly 230 is shown. The ramp assembly 200 is similar to the previously described ramp assembly 100 of FIGS. 1-11. In this regard, components of ramp assembly 200 correspond to components of ramp assembly 100, wherein each part indicated by a 200-series reference number is similar to the part indicated by the corresponding 100-series number unless otherwise indicated, e.g., 1XX corresponds to 2XX. The counterbalance assembly 230 of ramp assembly 200 will now be described with the understanding that the second embodiment of the counterbalance assembly 230 is similar to the first embodiment of the counterbalance 130 except as described hereafter.

Figure 12:
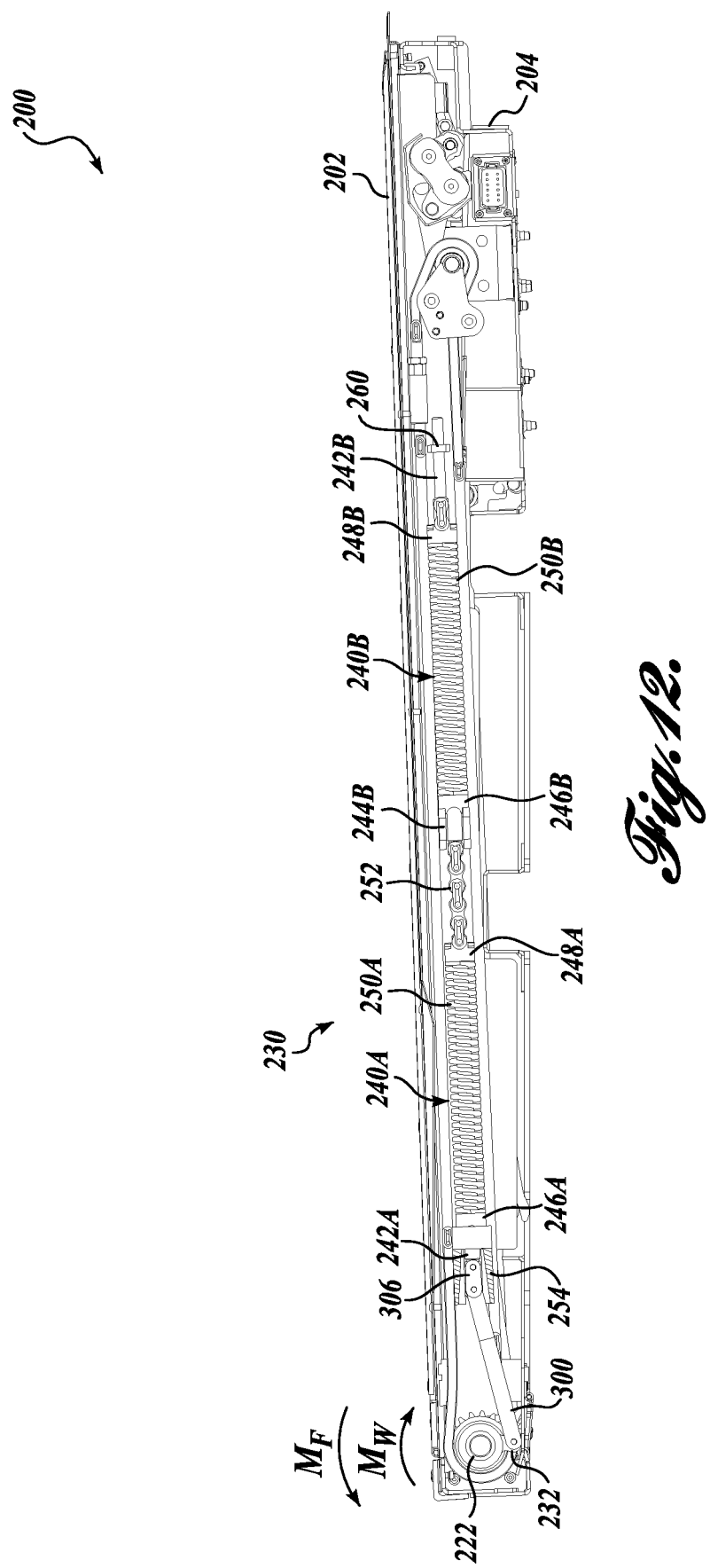
FIG. 12 shows a side view of a ramp assembly having a second exemplary embodiment of a counterbalance, with the ramp portion in a stowed position.

As shown in FIG. 12, the counterbalance assembly 230 includes first and second spring assemblies 240A and 240B connected by a chain 252. Similar to the counterbalance 130 of FIGS. 5-11, the first and second spring assemblies 240A and 240B are compressed as the ramp portion 202 moves from the neutral position (FIG. 16) toward the stowed position (FIG. 15), and also as the ramp portion moves from the neutral position toward the deployed position (FIG. 17). As a result, the first and second spring assemblies 240A and 240B provide a force F that biases the ramp portion 202 toward the neutral position, thereby counteracting the moment $M_W$ imparted by the weight of the ramp portion.

Figure 13:
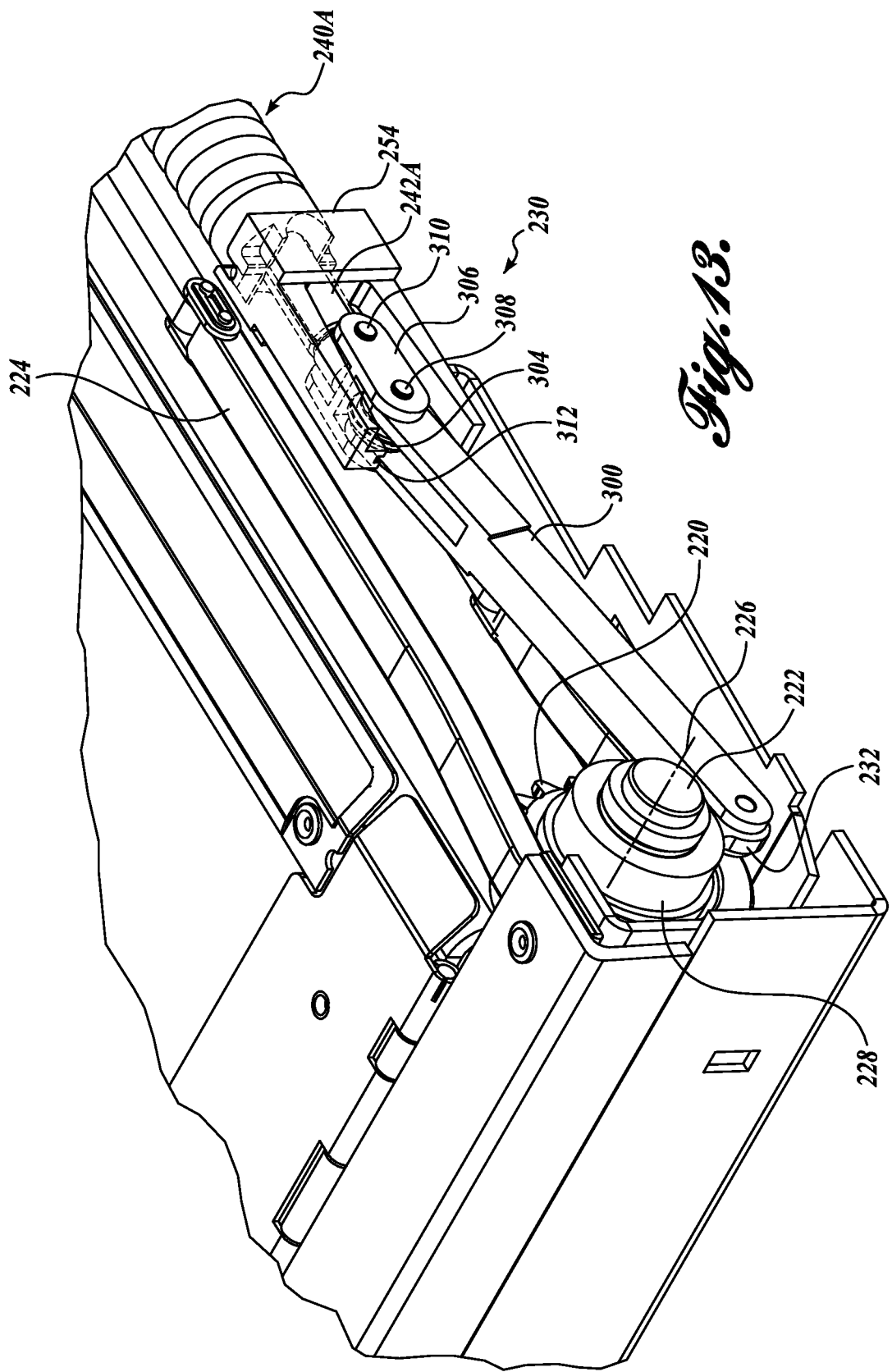
FIG. 13 shows a partial isometric view of the counterbalance assembly of FIG. 12.
Figure 14:
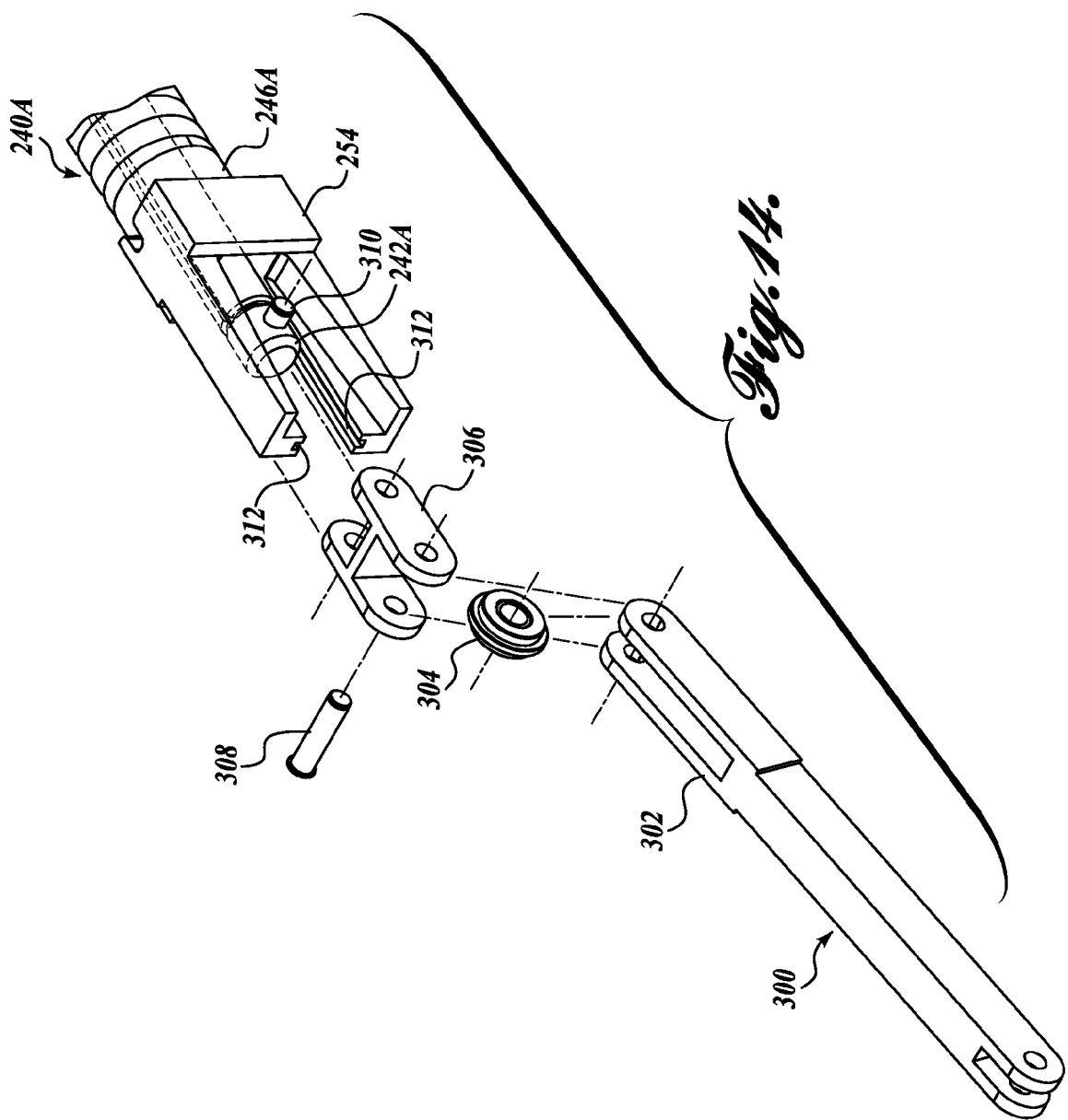
FIG. 14 shows an exploded partial isometric view of the counterbalance assembly of FIG. 12.

As best shown in FIGS. 13 and 14, a link 300 translates movement of the ramp portion 202 into compression of the springs 250A and 250B. A first end of the link 300 is rotatably coupled to the lug 232 so that movement of the ramp portion 202 between the stowed position and the deployed position moves the first end of the link along an arcuate path. A second end of the link 132 includes a clevis 302 with a bearing element 304 rotatably mounted between the legs of the clevis by a pin 308.

A curbside end of the rod 242A from the second spring assembly 240 extends through a guide 254, which is fixedly positioned to a fixed portion 204 of the ramp assembly 200.

The rod 242A slidingly engages the guide 254 so that movement of the rod in a roadside direction compresses the first and second spring assemblies 240A and 240B.

The roadside end of rod 242A is coupled to the second end of the link 300 by a coupler 306. The coupler 306 is rotatably coupled to the rod 242 by a pin 310. The coupler 300 is also coupled to the second end of the rod 242A by pin 308. The pins 308 and 310 are positioned to be generally horizontal and parallel to each other.

The bearing element 304 is vertically disposed with a slot 312 formed in the guide 254. As the rod 242A reciprocates in the curbside/roadside direction, the bearing element 304 remains disposed within the slot 312 so that any vertical components of the force applied by the link 300 are reacted into the guide 254. Thus, the rod 242A does not react these vertical load components, which prevents a bending moment from being imparted on the rod 242A, particularly when the ramp is in the stowed and deployed positions, i.e., when the moment arm of the rod and the vertical components of force are at their greatest. As a result, only the horizontal component of force F is transferred to the rod 242A. Although the disclosed attachment of the link 300 to the rod 242A reduces or eliminates bending moments imparted on the rod by the link, it will be appreciated that other configurations in which the link is coupled directly or indirectly to the rod are possible, and such configurations should be considered within the scope of the present disclosure.

Figure 15:
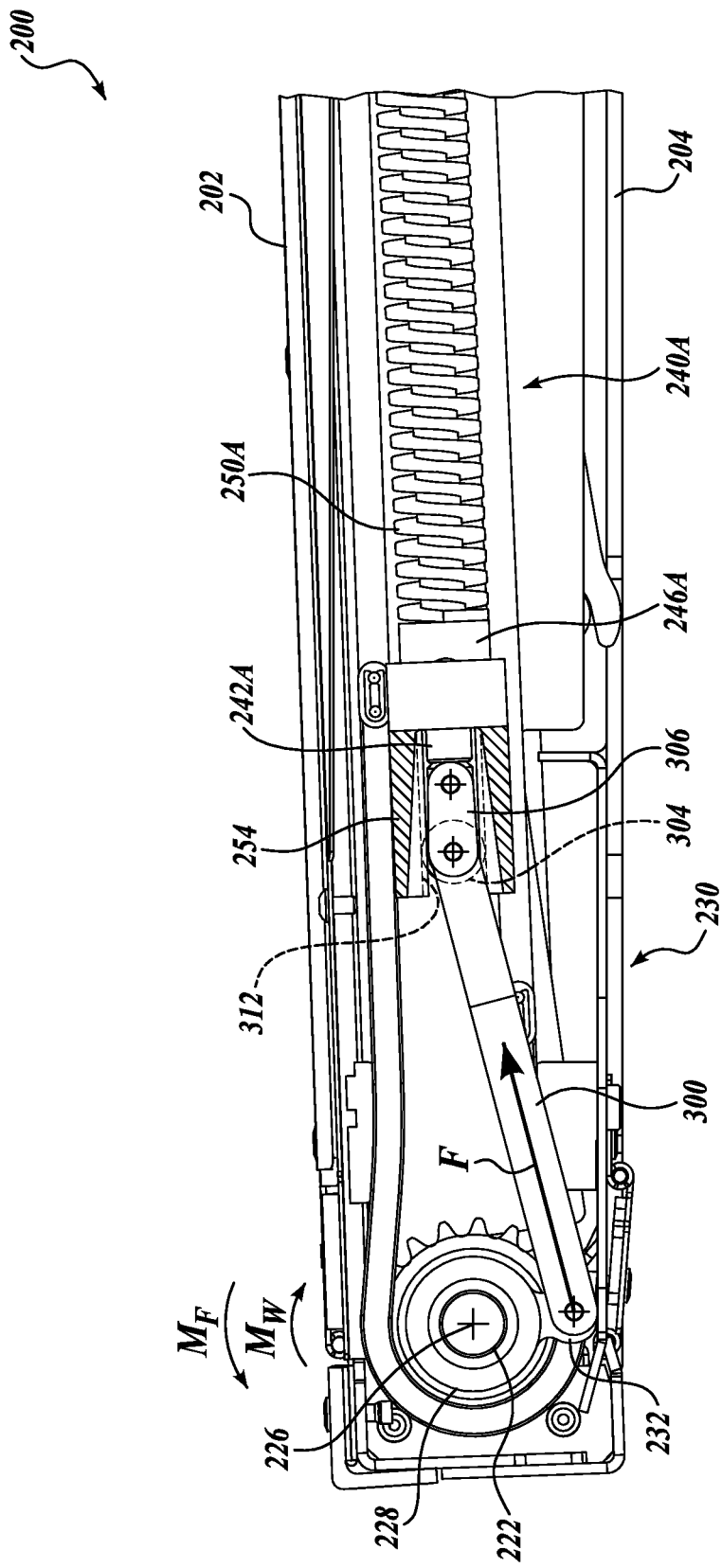
FIG. 15 shows a partial side view of the counterbalance assembly of FIG. 12, with the ramp portion in the stowed position.

Referring now to FIGS. 15-17, the counterbalance 230 provides a force F that increases as the ramp portion 202 moves away from the neutral position. The counterbalance operates in a manner similar to the previously described embodiment of FIGS. 9-11 except that the link 300 applies the counterbalancing force F to the lug 232 rather than the chain 134. That is, as the ramp portion moves away from the neutral position, the springs 250A and 250B are compressed, which applies a force F to the lug 232 through the link 300, thereby imparting a moment $M_F$ that counteracts the moment $M_W$ imparted by the weight of the ramp portion 202. As the ramp portion 202 moves further from the neutral position, the moment arm of $M_F$ also increases, further increasing the value of moment $M_F$ So that $M_F$ increases as $M_W$ increases.

While illustrative embodiments have been illustrated and described, it will be appreciated that various changes can be made therein without departing from the spirit and scope of the invention.

The embodiments of the invention in which an exclusive property or privilege is claimed are defined as follows:

1. A ramp assembly, comprising:
   (a) a ramp portion configured for reciprocating motion between a stowed position, a deployed position, and a neutral position; and
   (b) a counterbalance associated with the ramp portion, comprising:
      (i) a lug associated with the ramp portion, movement of the ramp portion toward the deployed position moving the lug along an arcuate path in a first direction, movement of the ramp portion toward the stowed position moving the lug along the arcuate path in a second direction;
      (ii) a link having a first end rotatably coupled to the lug;
      (iii) a guide fixedly located relative to the stowed position of the ramp portion;
      (iv) a biasing element associated with the link, movement of the ramp portion away from the neutral position moving the biasing element toward the guide; and
      (v) a spring disposed between the guide and the biasing element, wherein (1) movement of the ramp portion from the neutral position toward the stowed position compresses the spring, and (2) movement of the ramp portion from the neutral position toward the deployed position compresses the spring.

2. The ramp assembly of claim 1, wherein the spring provides a force to bias the ramp portion (1) toward the stowed position when the ramp portion is between the deployed position, and the neutral position, and (2) toward the deployed position when the ramp portion is between the stowed position and the neutral position.

3. The ramp assembly of claim 1, further comprising a rod slidably engaging the guide, a first end of the rod being rotatably coupled to a second end of the link.

4. The ramp assembly of claim 3, wherein the biasing element is coupled to a second end of the rod.

5. The ramp assembly of claim 4, further comprising a spring stop slidingly disposed on the rod, the spring stop being positioned between the spring and the guide.

6. A ramp assembly, comprising:
   (a) a ramp portion configured for reciprocating motion between a stowed position, a deployed position, and a neutral position; and
   (b) a counterbalance associated with the ramp portion, comprising:
      (i) a lug associated with the ramp portion, movement of the ramp portion toward the deployed position moving the lug along an arcuate path in a first direction, movement of the ramp portion toward the stowed position moving the lug along the arcuate path in a second direction;
      (ii) a link having a first end rotatably coupled to the lug;
      (iii) a guide fixedly located relative to the stowed position of the ramp portion;
      (iv) a biasing element associated with the link, wherein (1) movement of the ramp portion from the neutral position toward the stowed position moves the biasing element toward the guide, and (2) movement of the ramp portion from the neutral position toward the deployed position moves the biasing element toward the guide; and
      (v) a spring disposed between the restraint and the biasing element, a spring disposed between the restraint and the biasing element.

7. The ramp assembly of claim 6, wherein movement of the biasing element toward the guide compresses the spring.

8. The ramp assembly of claim 6, further comprising a rod slidably engaging the guide, a first end of the rod being rotatably associated with a second end of the link.

9. The ramp assembly of claim 8, further comprising a coupler, a first end of the coupler being rotatably coupled to the first end of the rod, a second end of the coupler being coupled to the second end of the link.

10. The ramp assembly of claim 8, further comprising a bearing element rotatably associated with the rod, the bearing element being disposed within a slot formed in the guide.

11. The ramp assembly of claim 8, further comprising a spring stop slidingly disposed on the rod, the spring stop being positioned between the spring and the guide.

* * * * *